United States Patent [19]

Kaminski

[11] 3,952,443

[45] Apr. 27, 1976

[54] FISHING REEL ACCESSORY

[75] Inventor: Joseph F. Kaminski, Utica, N.Y.

[73] Assignee: The Raymond Lee Organization, Inc., New York, N.Y. ; a part interest

[22] Filed: Aug. 12, 1974

[21] Appl. No.: 496,350

[52] U.S. Cl. .................................. 43/25; 43/19; 43/20
[51] Int. Cl.² ........................................ A01K 89/00
[58] Field of Search ........................... 43/25, 20, 19; 242/84.53, 84.5, 84.1 K

[56] References Cited
UNITED STATES PATENTS

| | | |
|---|---|---|
| 2,225,719 | 12/1940 | Shotton .................................. 43/20 |
| 3,803,745 | 4/1974 | Freihammer ........................... 43/20 |

FOREIGN PATENTS OR APPLICATIONS

| | | |
|---|---|---|
| 575,057 | 3/1958 | Italy ........................................ 43/25 |

Primary Examiner—Louis G. Mancene
Assistant Examiner—Peter K. Skiff
Attorney, Agent, or Firm—Daniel Jay Tick

[57] ABSTRACT

A fishing reel accessory for a fishing reel mounted on a fishing pole at the handle thereof and having fishing line wound therearound comprises a brake member mounted on the pole adjacent the handle and the reel for selectively manually preventing unwinding of the reel.

2 Claims, 2 Drawing Figures

U.S. Patent   April 27, 1976   3,952,443

FISHING REEL ACCESSORY

DESCRIPTION OF THE INVENTION

The present invention relates to a fishing reel accessory.

Objects of the invention are to provide a fishing reel accessory of simple structure, which is inexpensive in manufacture, is readily installable with facility and convenience on new and existing fishing poles and functions efficiently, effectively and reliably to prevent slipping of the fishing line wound on the fishing reel of a fishing pole during casting.

Figure 1:
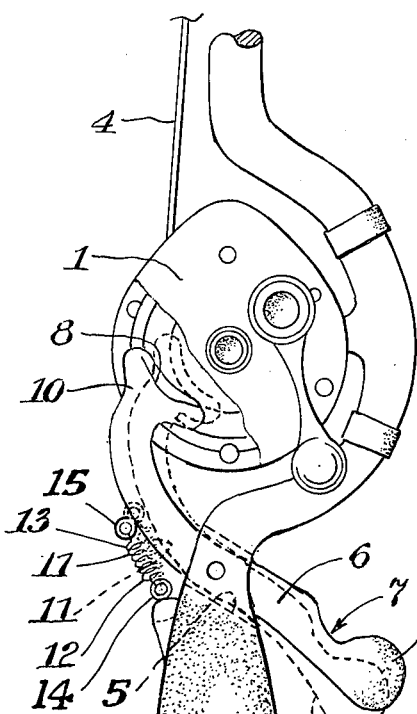
Figure 2:
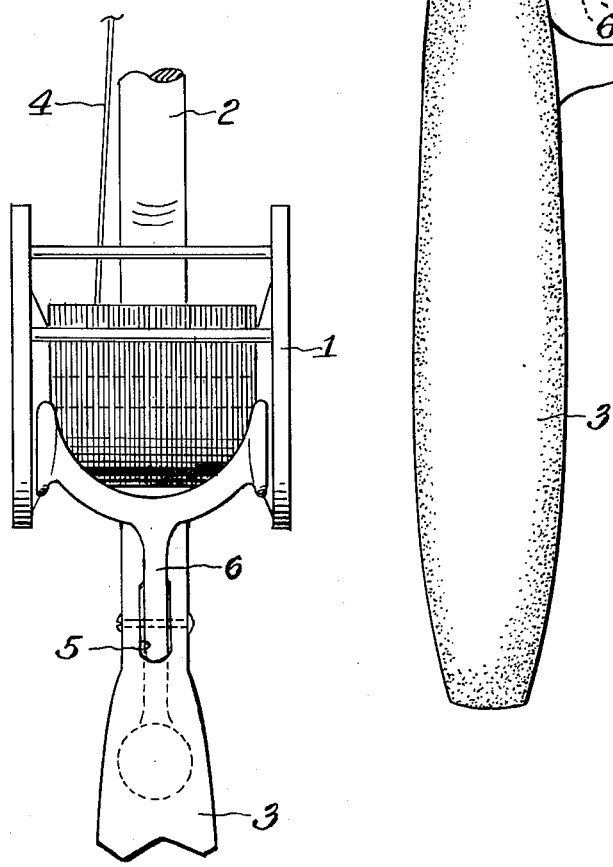

In order that the invention may be readily carried into effect, it will now be described with reference to the accompanying drawing, wherein:

FIG. 1 is a side view of an embodiment of the fishing reel accessory of the invention; and FIG. 2 is a top view of the embodiment of FIG. 1.

In the FIGS., the same components are identified by the same reference numerals.

The fishing reel accessory of the invention is for a fishing reel 1 mounted on a fishing pole 2 at the handle 3 thereof and having fishing line 4 wound there-around.

In accordance with the invention, a brake member is mounted on the pole 2 adjacent the handle 3 and the reel 1. The brake member selectively manually prevents unwinding of the reel thereby preventing slipping of the fishing line 4 during casting.

The brake member comprises a bore 5 (FIG. 2) formed through the pole 2 between the handle 3 and the reel 1. An arm 6 is pivotally mounted at substantially its center in the bore 5 and extends beyond the pole at both ends. A recess 7 (FIG. 1) is formed in the arm 6 at one end to accomodate a finger of the user. Braking material 8 (FIG. 1) is affixed to the arm 6 at the other end thereof. Thus, when the one end 9 of the arm 6 is gripped and pulled by the user, the braking material at the other end 10 of the arm abuts the line 4 on the reel 1 and prevents the unwinding of the reel.

A spring 11 (FIG. 1) is affixed at one end 12 to the pole 2 via a small ring pin 14 and is affixed at the other end 13 to the arm 6 via a small ring pin 15 in the area of the end 10 thereof and urges the braking material 8 away from the reel 1.

While the invention has been described by means of a specific example and in a specific embodiment, I do not wish to be limited thereto, for obvious modifications will occur to those skilled in the art without departing from the spirit and scope of the invention.

I claim:

1. A fishing reel accessory for a fishing reel mounted on a fishing pole at the handle thereof and having fishing line wound therearound, said fishing reel accessory comprising a brake member mounted on the pole adjacent the handle and the reel for selectively and manually preventing unwinding of the reel, said brake member comprising a bore formed through the pole between the handle and the reel, an arm having first and second spaced opposite ends and a center substantially equidistantly spaced from the first and second ends, said arm being pivotally mounted at substantially its center in the bore and extending beyond the pole at both ends, a recess formed in the arm at the first end to accommodate a finger of a user and braking material affixed to the arm at the second end in a manner whereby the second end of the arm is normally spaced from the line on the reel and when the first end of the arm is gripped and pulled by a finger of the user, the braking material at the second end of the arm abuts the line on the reel and prevents the unwinding of the reel.

2. A fishing reel accessory as claimed in claim 1, further comprising a spring affixed at one end to the pole and affixed at the other end to the arm in the area of the second end thereof and urging the braking material away from the reel.

* * * * *